United States Patent
Shiraishi et al.

(10) Patent No.: US 8,271,485 B2
(45) Date of Patent: Sep. 18, 2012

(54) REPLY GENERATION APPARATUS AND METHOD AND PROGRAM FOR CAUSING COMPUTER TO FUNCTION AS REPLY GENERATING APPARATUS

(75) Inventors: Tomihisa Shiraishi, Iizuka (JP); Atsuhiro Iwasaki, Iizuka (JP)

(73) Assignee: I-Business Center Corporation, Iizuka-Shi, Fukuoka (JP)

( * ) Notice: Subject to any disclaimer, the term of this patent is extended or adjusted under 35 U.S.C. 154(b) by 841 days.

(21) Appl. No.: 12/225,922

(22) PCT Filed: Apr. 5, 2007

(86) PCT No.: PCT/JP2007/058021
§ 371 (c)(1),
(2), (4) Date: Oct. 2, 2008

(87) PCT Pub. No.: WO2007/117031
PCT Pub. Date: Oct. 18, 2007

(65) Prior Publication Data
US 2009/0094204 A1    Apr. 9, 2009

(30) Foreign Application Priority Data
Apr. 5, 2006  (JP) .................. 2006-103717

(51) Int. Cl.
*G06F 7/00* (2006.01)
*G06F 17/00* (2006.01)
*G06F 17/30* (2006.01)

(52) U.S. Cl. .......... 707/731; 707/665; 707/899
(58) Field of Classification Search .......... 707/1, 715; 704/257; 705/1; 709/223
See application file for complete search history.

(56) References Cited

U.S. PATENT DOCUMENTS

| | | | |
|---|---|---|---|
| 7,421,441 B1 * | 9/2008 | Chan et al. | 1/1 |
| 7,716,211 B2 * | 5/2010 | Peltonen et al. | 707/715 |
| 7,840,407 B2 * | 11/2010 | Strope et al. | 704/257 |
| 2005/0071328 A1 * | 3/2005 | Lawrence | 707/3 |
| 2006/0026013 A1 * | 2/2006 | Kraft | 705/1 |

FOREIGN PATENT DOCUMENTS

| | | |
|---|---|---|
| JP | 11-39334 | 2/1992 |
| JP | 2005-196572 | 7/2005 |
| JP | 2005-301856 | 10/2005 |
| JP | 2006-59082 | 3/2006 |

* cited by examiner

*Primary Examiner* — Susan Chen
(74) *Attorney, Agent, or Firm* — McGinn IP Law Group, PLLC

(57) ABSTRACT

A reply conforming to applied search criteria is generated using data obtained by a search based upon the search criteria. A reply generating server includes a storage unit storing a plurality of items of basic data; a search unit for searching and retrieving basic data, which is in line with search criteria that has been input by the user of a terminal device, from the storage unit; a reply generating unit which, in a case where a plurality of items of basic data in line with the search criteria exist, generates anew a reply conforming to the search criteria by utilizing the plurality of items of basic data; and a reply transmitting unit for transmitting the reply to the terminal device.

12 Claims, 8 Drawing Sheets

| CATEGORY ITEM / BASIC DATA | A | B | C | D | E | F | FIXED FORMAT | |
|---|---|---|---|---|---|---|---|---|
| | | | | | | | G | H |
| BASIC DATA 1 | $A_1$ | $B_1$ | | $D_1$ | $E_1$ | $F_1$ | $G_1$ | |
| BASIC DATA 2 | $A_2$ | $B_2$ | | $D_2$ | $E_2$ | $F_2$ | $G_2$ | |
| BASIC DATA 3 | | | $C_3$ | $D_3$ | $E_3$ | $F_3$ | $G_3$ | |
| BASIC DATA 4 | | | $C_4$ | $D_4$ | $E_4$ | $F_4$ | $G_4$ | |
| BASIC DATA 5 | | | $C_5$ | | $E_5$ | | $G_5$ | |
| BASIC DATA 6 | | | $C_6$ | | $E_6$ | | $G_6$ | |
| BASIC DATA 7 | | | | $D_7$ | $E_7$ | | $G_7$ | |
| BASIC DATA 8 | | | | $D_8$ | | $F_8$ | $G_8$ | |
| BASIC DATA 9 | | | | $D_9$ | | $F_9$ | $G_9$ | |
| BASIC DATA 10 | | | | $D_{10}$ | | | | $H_{10}$ |
| FREQUENCY OF APPEARANCE | 2 | 2 | 4 | 8 | 7 | 6 | | |

OLD → NEW

Fig. 6

(1) CATEGORY ITEMS ABDEFG · · · · (REFERENCE VALUE 23)

(2) CATEGORY ITEMS DEFG · · · · (REFERENCE VALUE 21)

(3) CATEGORY ITEMS CDEFG · · · · (REFERENCE VALUE 21)

(4) CATEGORY ITEMS ABDEG · · · · (REFERENCE VALUE 13)

(5) CATEGORY ITEMS ABDFG · · · · (REFERENCE VALUE 12)

(6) CATEGORY ITEMS DEG · · · · (REFERENCE VALUE 11)

(7) CATEGORY ITEMS CDEG · · · · (REFERENCE VALUE 11)

(8) CATEGORY ITEMS DFG · · · · (REFERENCE VALUE 10)

(9) CATEGORY ITEMS CDFG · · · · (REFERENCE VALUE 10)

(10) CATEGORY ITEMS ABDH · · · · (REFERENCE VALUE 8)

(11) CATEGORY ITEMS DH · · · · (REFERENCE VALUE 6)

(12) CATEGORY ITEMS CDH · · · · (REFERENCE VALUE 6)

| CATEGORY ITEM / BASIC DATA | A | B | C | D | E | F | FIXED FORMAT | |
|---|---|---|---|---|---|---|---|---|
| | | | | | | | G | H |
| BASIC DATA 1 | $A_1$ | $B_1$ | | $D_1$ | $E_1$ | $F_1$ | $G_1$ | |
| BASIC DATA 2 | $A_2$ | $B_2$ | | $D_2$ | $E_2$ | $F_2$ | $G_2$ | |
| BASIC DATA 3 | | | $C_3$ | $D_3$ | $E_3$ | $F_3$ | $G_3$ | |
| BASIC DATA 4 | | | $C_4$ | $D_4$ | $E_4$ | $F_4$ | $G_4$ | |
| BASIC DATA 5 | | | $C_5$ | | $E_5$ | | $G_5$ | |
| BASIC DATA 6 | | | $C_6$ | | $E_6$ | | $G_6$ | |
| BASIC DATA 7 | | | | $D_7$ | $E_7$ | | $G_7$ | |
| BASIC DATA 8 | | | | $D_8$ | | $F_8$ | $G_8$ | |
| BASIC DATA 9 | | | | $D_9$ | | $F_9$ | $G_9$ | |
| BASIC DATA 10 | | | | $D_{10}$ | | | | $H_{10}$ |
| PRECEDING-SUCCEEDING-ADJACENT-CATEGORY COUNTS | 2 | 4 | 4 | 12 | 14 | 12 | | |

OLD → NEW

REPLY GENERATION APPARATUS AND METHOD AND PROGRAM FOR CAUSING COMPUTER TO FUNCTION AS REPLY GENERATING APPARATUS

BACKGROUND OF THE INVENTION

1. Field of the Invention

This invention relates to an apparatus and method for searching and retrieving data, which is in accordance with search criteria, from among a plurality of items of stored data, and generating anew a reply in compliance with the search criteria using the data that has been retrieved by the search. The invention further relates to a program for causing a computer to function as such a reply generating apparatus.

2. Description of the Related Art

In a search system according to the prior art, as described for example in the specification of Japanese Patent Application Laid-Open No. 2005-301856, if there are a plurality of items of data that match or are similar to search criteria that has been input by the user (referred to as "searcher" below) of the search system, then these items of data are presented to the searcher in the form of a list.

However, the conventional search system merely informs the searcher of the data held in the search system and does not make a judgment using a prescribed criterion, generate information judged to be in conformity with the wish (search criteria) of the searcher and present the information. As a consequence, the searcher cannot achieve real communication with the search system. The search system is incapable of generating, as information, what the searcher really wants to know through dialog between the searcher and the search system.

SUMMARY OF THE INVENTION

Accordingly, an object of the present invention is to provide a reply generating apparatus for generating anew a suitable reply with respect to applied search criteria utilizing information found by a search based upon the applied search criteria.

The reply generating apparatus according to the present invention has a storage unit in which a plurality of aggregates (data representing aggregates) have been stored. An aggregate has a plurality of segments (data representing the segments), each of which has a logical meaning, arranged in a logical order.

Each of the plurality of segments constituting the aggregate has been classified under any of a plurality of category items (attribute items) in accordance with the attribute thereof. Since the plurality of segments constituting the aggregate have been arranged in order, the category items corresponding to the respective plurality of segments are also arranged in order.

In accordance with the applied search criteria, an aggregate in line with the search criteria is retrieved from among the plurality of aggregates that have been stored in the storage unit. Applied search criteria may be the wish (e.g., a query) of the searcher substituted for search criteria suited to search processing, or it may be so arranged that the search criteria per se suited to the search processing are applied.

The reply generating apparatus according to the present invention executes the processing set forth below in a case where a plurality of aggregates have been found by a search in accordance with applied search criteria.

In a case where a plurality of aggregates in line with search criteria have been found, an adjacent-category count calculation, in which the adjacent-category count indicates the number of other category items adjacent to one category item, is performed with regard to each of the plurality of category items corresponding to the plurality of segments constituting each of the plurality of aggregates found. Since the category items corresponding to the respective plurality of segments have been arranged in order, as mentioned above, one category item will have another category item adjacent thereto. If a plurality of aggregates are considered, one category item will have a plurality of other category items adjacent thereto.

A core category item is decided from among the plurality of category items corresponding to the plurality of segments constituting each of the plurality of aggregates found. The core category item is one category item from among the plurality of category items that is to be included (the inclusion of which is desirable) in a logical framework of a generated reply in terms of a relationship with the search criteria. Preferably, a category item construed to have a high degree of association (relevancy) with the search criteria is decided upon as the core category item.

By way of example, from among a plurality of category items corresponding to a plurality of segments constituting a plurality of aggregates found by a search, the category item of the largest number can be decided upon as the core category item. From among a plurality of category items, the category item having the largest number of adjacent other category items may be decided upon as the core category item.

The logical framework of a reply generated by the reply generating apparatus of the present invention has the decided core category item as the core thereof and has other category items placed adjacent to the core category item. Category items other than the core category item included in the logical framework are related category items. A related category item is a category item that is to be included (the inclusion of which is desirable) in the generated logical framework in terms of a relationship with the core category item that has been decided. Preferably, a category item construed to have a high degree of association (relevancy) with the decided core category item is decided upon as a related category item.

A related category item is decided from among category items other than the category item decided upon as the core category item, based upon the adjacent-category counts calculated by the adjacent-category count calculating unit. For example, the category item for which the adjacent-category count with respect to the core category item is largest can be adopted as a related category item adjacent to the core category item. From among category items adjacent to the core category item, the category item having the largest number of adjacent other category items may be decided upon as the related category item with respect to the core category item.

If other category items further adjacent to a decided related category item adjacent to the core category item exist, then from among these category items further adjacent to the decided related category item adjacent to the core category item, related category items further adjacent to the related category item adjacent to the core category item can be decided in a manner similar to that described above.

By adopting the decided core category item as the core and arranging the related category item by making it adjacent to the core category item, the logical framework of a reply for which a plurality of category items and the order of arrangement thereof have been determined is generated.

In accordance with the present invention, the logical framework of a reply can be made one in which a core category item having a high relevancy with search criteria is placed at the core and a related category item having a high relevancy with the core category item is arranged by being made adjacent to the core category item. It is possible to obtain a logical framework of a reply that will incorporate, with a substantial degree of certainty, a category item necessary to respond to search criteria (a category item for which there a high likelihood of being necessary). A logical framework of a reply that substantially satisfies the search criteria can be obtained.

Preferably, the reply generating apparatus further comprises an expression deciding unit for deciding upon any one of segments, which have been stored in the storage unit and classified under a core category item, as a segment that expresses the core category item, and deciding upon any one of segments, which have been stored in the storage unit and classified under the related category item, as a segment that expresses the related category item. For example, from among segments constituting a plurality of aggregates found by a search unit, segments in an aggregate created most recently can be adopted as segments that express the core category item and related category item.

In an embodiment, a related category item deciding unit decides a plurality of related category items adjacent to a core category item. A logical-framework generating unit prioritizes each of a plurality of combinations of the core category item and related category items based upon the adjacent-category counts calculated by the adjacent category count calculating unit regarding the core category item and related category items that exist in the combination, and, in a case where a related category item of part of a low-priority combination matches a related category item of part of a high-priority combination, excludes the low-priority combination from the logical framework generated in the logical framework generating unit. A logical framework in which a redundant expression has merely been added to a high-priority logical framework is thus excluded. This makes it possible to present only replies that are essentially significant.

In another embodiment, the category items include a fixed-format category item under which a segment having a stereotypical meaning is classified. The core category item deciding unit decides the core category item from among category items other than the fixed-format category item. An essentially related category item and not one that is simply perfunctorily applicable to the search criteria can be decided upon as the core category item.

The present invention also provides a method of generating a reply that is in conformity with search criteria. A method of generating a reply according to the present invention comprises the steps of: storing a plurality of aggregates in a storage unit, wherein an aggregate is a plurality of segments each having a logical meaning and arranged in a logical order, each segment being classified under any of a plurality of category items in accordance with an attribute of the segment; searching the storage unit in accordance with applied search criteria; deciding a core category item in a case where a plurality of aggregates in line with the search criteria have been found, wherein the core category item is decided from among a plurality of category items corresponding to a plurality of segments constituting each of the aggregates found; performing an adjacent-category count calculation, in which the adjacent-category count indicates the number of other category items adjacent to one category item, in a case where a plurality of aggregates in line with the search criteria have been found, the adjacent-category count being calculated with regard to each of the plurality of category items corresponding to the plurality of segments constituting each of the plurality of aggregates found; deciding a related category item adjacent to the core category item from among category items other than the category item decided upon as the core category item, based upon the adjacent-category counts calculated; and generating a logical framework of a reply, in which a plurality of category items and the order of arrangement thereof have been determined, by adopting the core category item as the core and arranging the related category item by placing it adjacent to the core category item.

The present invention also provides a program for causing a computer to function as a reply generating apparatus.

The reply generating apparatus is such that if, in a case where search criteria have been set anew, search criteria related to the newly set search criteria exists in search criteria set in the past, then in one or both of processing for searching for an aggregate pertaining to the newly set search criteria and processing for generating a logical framework, reference may be made as necessary to, e.g., the related search criteria, information relating to a user of the reply generating apparatus who set the related search criteria, search processing that is based upon this related search criteria and logical-framework generation processing that is based upon this related search criteria. By thus making reference, it is possible for the searcher to obtain information that is more likely to be what the searcher truly wants to know. As a result, a true dialog between computer and human (a real exchange of question and answer) becomes possible.

Further, with regard to the processing for searching for an aggregate, the reply generating apparatus, based upon a query entered by the searcher, may generate search criteria in accordance with a prescribed search-criteria setting procedure, and the search processing may be executed based upon this generated search criteria. It may be so arranged that if search criteria has been set again, an aggregate that has been found by a search based upon this re-set search criteria is referred to as necessary.

Further, an aggregate that has been stored in the storage unit may be based upon text that is logical and has time-wise relevancy (a flow), i.e., text that is capable of being divided into segments having meaning, in which these segments are related to one another logically and in a time series, by way of example, and the reply generating apparatus may generate a reply by combining these segments of an aggregate. Thus, the reply generating apparatus generates a reply in conformity with the nature of the aggregate that has been stored in the storage unit and presents this reply to the searcher, whereby the searcher is capable of obtaining information that is what the searcher truly wants to know. Such reply generation processing does not adopt a mere description or expression of text as the reference but instead focuses on the content and relevancy of each segment of the text.

Furthermore, an aggregate that has been stored in the storage unit may by one that includes text data, and the text data may be data that has been generated based upon information relating to an image, etc.

In accordance with the present invention, it is possible to present information generated so as to be the information the user desires. Through a dialog with the reply generating apparatus, it is possible for the user to generate and acquire the information the user truly wants to know.

Furthermore, the reply generating apparatus according to the present invention can be used at, e.g., a company support center, to consolidate past examples of replies to queries from consumers and generate a suitable reply. Further, the apparatus can also be used to perform an operation such as proofreading of a document. Further, the apparatus can be used in a system that provides a voiced reply to a voiced query from a user. Further, by being applied to a stuffed toy or robot, etc., the apparatus can be used to implement a sophisticated communication system based upon voice exchanged between human and machine.

An aggregate and the segments constituting the aggregate, which have been stored in the storage unit provided in the reply generating apparatus, will now be explained in simple terms.

For example, assume that each of the plurality of segments is text having logical meaning. In this case, the aggregate is the integrated whole of the text in which the plurality of text passages have been arranged in a logical order.

Take the following as one example: Replies (presentation of solutions) to a query "THE COMPUTER DOES NOT RECOGNIZE THE DVD" have been stored as an aggregate in the storage unit. Assume that one example of the aggregate in this case is an integrated whole of a plurality of sentences in which the following are included in the order mentioned: a "first reply" indicating a "greeting sentence" and a proposed solution to the above-mentioned query (the problematic phenomenon) (this reply is text, etc., describing one specific example of a computer operation in order to cause the computer to recognize the DVD); a "second reply" in a case where a solution is not provided by the first reply; a "third reply" in a case where a solution is not provided by the second reply; a "contact destination" in a case where a further query is made; and a "company name" of the company that is replying. The specific text passages representing (describing) respective ones of the "greeting sentence", "first reply", "second reply", "third reply", "contact destination" and "company name" are the "segments" that constitute the aggregate. The whole of the specific text from the "greeting sentence" to the "company name" is the "aggregate".

As mentioned above, each of the segments constituting the aggregate has been classified under any of a plurality of category items in accordance with the attribute thereof. Attributes include meaning, content, etc. For example, assume that "THANK YOU FOR YOUR INQUIRY" is included in a segment constituting one aggregate that has been stored in the storage unit, and that "THANK YOU VERY MUCH FOR YOUR QUESTION" is included in a segment constituting another aggregate that has been stored in the storage unit. "THANK YOU FOR YOUR INQUIRY" and "THANK YOU VERY MUCH FOR YOUR QUESTION" are both classified under the category item "greeting sentence".

An aggregate that has been stored in the storage unit is not only of the kind in which a plurality of segments have been arranged one-dimensionally as in the manner of the replies to the question cited above. Aggregates can include one in which a plurality of segments have been arranged two-dimensionally as in the manner of a map and one in which a plurality of segments have been arranged three-dimensionally or in higher dimensions.

The adjacent-category count calculated by the adjacent category count calculating unit will be described in simple terms.

For example, assume that one aggregate is composed of segments A1, B1 and C1 and that category items corresponding to the segments A1, B1 and C1 are category items A, B and C, respectively. Assume also that another aggregate is composed of segments A2, B2 and D2 and that category items corresponding to the segments A2, B2 and D2 are category items A, B and D, respectively. If this one aggregate and the other aggregate are aggregates that have been found by the search unit, then the present invention handles this by construing that two category items B are adjacent to category item A; that two category items A, one category item C and one category item D are adjacent to category item B; that one category item B is adjacent to category item C; and that one category item C is adjacent to category item D. By way of example, the adjacent-category count of category item B with respect to category item A is two.

BRIEF DESCRIPTION OF THE DRAWINGS

FIG. 6 illustrates combinations of category items, which are obtained by the reply generating server according to a second embodiment, together with priorities and reference values;

DESCRIPTION OF THE PREFERRED EMBODIMENTS

Embodiments of the present invention will be described with reference to the drawings.

First Embodiment

Figure 1:
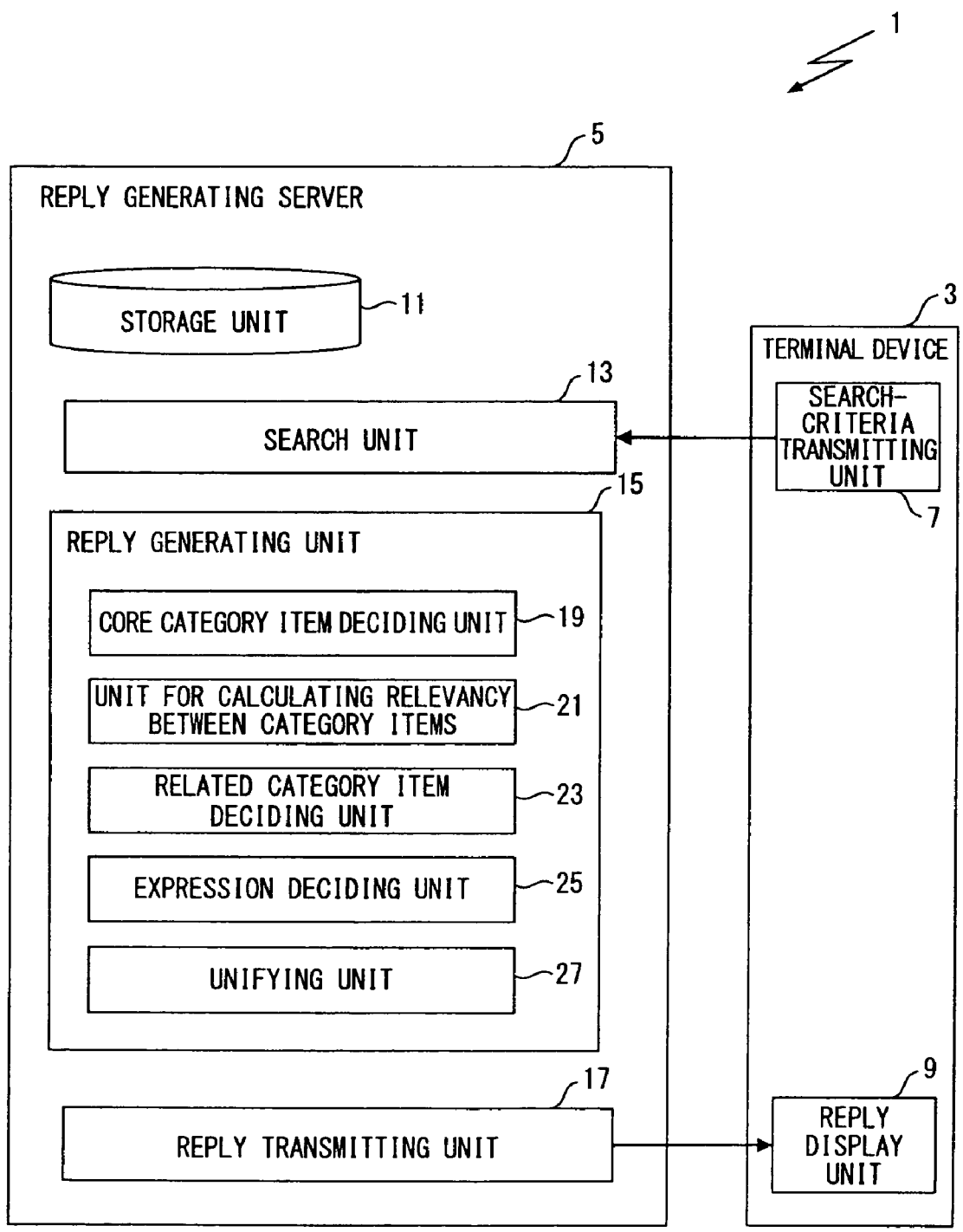
FIG. 1 is a block diagram illustrating a reply generating system according to an embodiment of the present invention.

A first embodiment of the present invention will be described with reference to FIGS. 1, 2, 3A and 3B. FIG. 1 is a block diagram illustrating a reply generating system 1 according to this embodiment of the present invention.

The reply generating system 1 includes a terminal device 3 to which search criteria are input by a user (searcher) of the reply generating system 1, and a reply generating server 5 for searching and retrieving data, which conforms to the search criteria, from already stored data based upon the search criteria entered by the searcher, and generating a reply with respect to the search criteria based upon the data that has been found by the search.

The terminal device 3 has a search-criteria transmitting unit 7 for sending the reply generating server 5 the search criteria entered by the searcher, and a reply display unit 9 for displaying the reply generated by the reply generating server 5.

The reply generating server 5 includes a storage unit 11 for storing a plurality of items of basic data (data representing aggregates); a search unit 13 that searches and retrieves basic data conforming to (matching or similar to) the search criteria from the basic data that has been stored in the storage unit 11; a reply generating unit 15 for generating data representing a reply to the search criteria by utilizing the basic data (and subjecting it to unification processing in accordance with a prescribed unification standard) found by the search conducted by the search unit 13; and a reply transmitting unit 17 for sending the terminal device 3 the data representing the reply.

In this embodiment, it is assumed that the basic data that has been stored in the storage unit 11 represents text capable of being divided into segments each of which has a coherent meaning and each of which has a logical relationship (i.e., text having a logical flow). The text represented by the basic data has been divided (classified) into a plurality of segments by the administrator of the reply generating server 5. Data representing each segment of the segments into which the text has been divided (classified) is referred to as "segment data". The details of the basic data and segment data will be described later.

Figure 2:
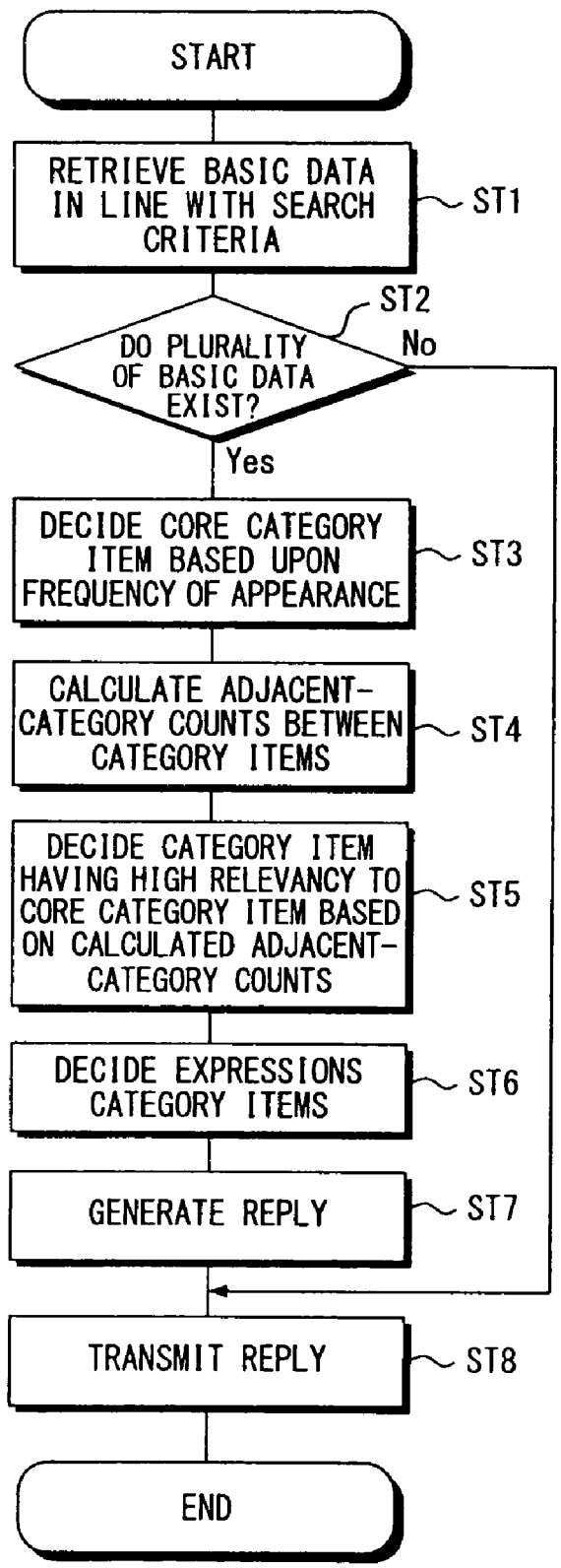
FIG. 2 is a flowchart illustrating an example of processing by a reply generating server according to a first embodiment.
Figures 3A, 3B:
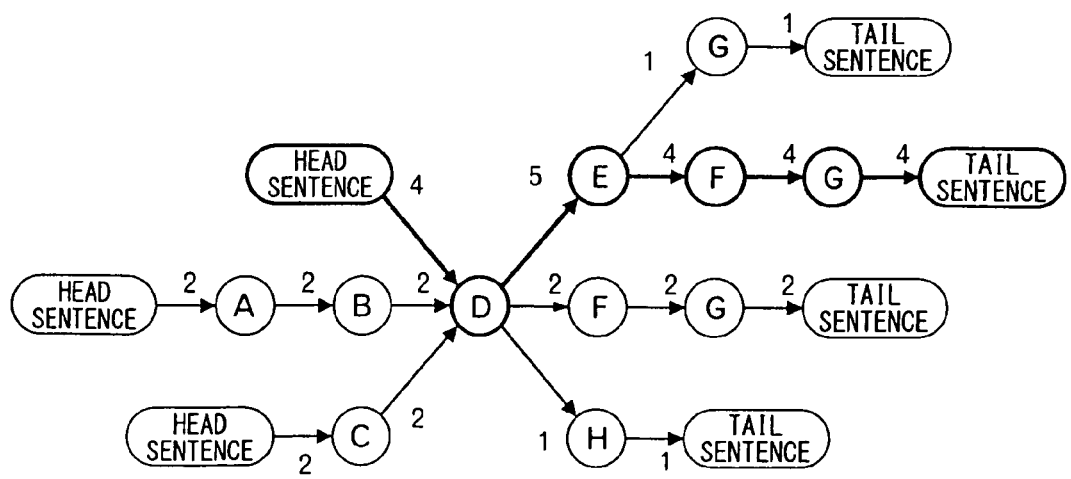
FIG. 3A illustrates an example of basic data found by a search conducted by a search unit.
FIG. 3B illustrates a core category item D as a starting point, the order of arrangement of other category items preceding and succeeding the core category item D, and adjacent-category counts shown between category items.

Next, the operation of the reply generating server 5 will be described with reference to FIG. 2 and FIGS. 3A, 3B. FIG. 2 is a flowchart illustrating an example of processing by the reply generating server 5, and FIG. 3A illustrates the relationship between basic data 1 to 10 that has been found by a search conducted by the search unit 13 of the reply generating server 5, and segment data included in the basic data 1 to 10. FIG. 3B is for facilitating understanding of the course of reply generation processing by the reply generating unit 15 of reply generating server 5 according to the first embodiment and illustrates the order of arrangement of category items (these will be described later) to which the segment data included in the basic data belongs, as well as the number of category items that are adjacent.

When the searcher inputs search criteria to the terminal device 3, the input search criteria is transmitted to the reply generating server 5 by the search-criteria transmitting unit 7. The search unit 13 of the reply generating server 5 searches and retrieves basic data that is in line with the search criteria from among the basic data that that has been stored in the storage unit 11 (step ST1 in FIG. 2).

Next, the reply generating unit 15 determines whether a plurality of items of basic data have been found by the search conducted by the search unit 13 (step ST2 in FIG. 2). If a plurality of items of basic data have been found ("YES" at step ST2), then processing from step ST3 onward in FIG. 2 is executed. If a plurality of items of basic data have not been found ("NO" at step ST2), then the reply transmitting unit 17 transmits data indicating that a reply corresponding to the search criteria has not been obtained or the one item of basic data found by the search to the terminal device 3 as the reply to the search criteria (step ST8). Processing by the reply generating server 5 ends.

Reference will be had to FIGS. 3A and 3B to describe processing from step ST3 onward for the case where a plurality of items of basic data have been found by the search conducted by the search unit 13. Here a case where the basic data found by the search by search unit 13 is basic data 1 to 10 will be taken as an example.

Each item of basic data has data representing its date of creation. Here it is assumed that the creation date of basic data 1 is the oldest and that the creation date becomes newer successively in the order of the numerals. The distinction between old and new data may just as well be made by version instead of creation date.

As mentioned earlier, basic data is data representing text capable of being divided into segments of coherent meaning, and has already been divided (classified) into a plurality of segments by the administrator of the reply generating server 5.

For example, text represented by the basic data 1 has been divided into six segments (segment data or text segments) A1, B1, D1, E1, F1 and G1. That is, the basic data 1 is data that includes six items of segment data, namely segment data A1, B1, D1, E1, F1 and G1. (In other words, the basic data 1 is data representing the integrated whole of text that is composed of a plurality of sentences.)

In the first embodiment, category items to which respective ones of the plurality of items of segment data included in basic data belong are indicated and distinguished from one another by the alphabetic characters A to H. For example, the six items of segment data A1, B1, D1, E1, F1 and G1 that constitute basic data 1 belong to the category items A, B, D, E, F and G, respectively. The basic data 1 is constituted by the category items ABDEFG.

Each of the items of segment data A1, B1, D1, E1, F1 and G1 representing the text segments that make up the whole of the text represented by the basic data 1 includes data indicating that it is segment data constituting the basic data 1, data specifying the category item, data specifying adjacent category items and text data, etc. For example, the segment data A1 includes data indicating that this is segment data constituting the basic data 1; data specifying that this segment data belongs to category item A; data specifying that the adjacent category item preceding the segment data A1 is the category item of a head sentence (fixed-format text) [in FIG. 3A, the category item (segment data) of the head sentence (and tail sentence) is not illustrated], and that the adjacent category item succeeding the segment data A1 is category item B (segment data B1); and text data.

Similarly, with regard to the other basic data 2 to 10, each item of basic data has been divided into a plurality of items of segment data, and each item of segment data belongs to one of the category items A to H to which the alphabetic characters of the segment data correspond, as illustrated in FIG. 3A.

It should be noted that the category items G and H among these category items are category items to which a fixed-format text segment, such as one that conveys the contact destination of the person in charge, belongs. It is assumed that these category items have been designated as fixed-format category items.

Although this will become apparent from the description that follows, the reply generating system 1 generates combinations of category items (combinations of category items A, B, C, etc., shown in the table of FIG. 3A). A category item stipulates a category (which may also be referred to as an "attribute") of segment data, as described above. That is, the reply generating system 1 according to this embodiment is characterized in that is generates combinations of category items that represent the logical framework of a reply that corresponds to search criteria.

A core category item deciding unit 19 decides a core category item (step ST3 in FIG. 2). Specifically, the core category item is one among a plurality of category items to which respective ones of a plurality of items of segment data that constitute a plurality of items of basic data found by the search by the search unit 13 belong. The fixed-format category items G and H are excluded from the core category item to be decided. With reference to FIG. 3A, the category item D is the category item that has the highest frequency of appearance among the category items A to F (the fixed-format category items G and H are excluded) included in the items of basic data 1 to 10 found by the search conducted by the search unit 13. The core category item deciding unit 19 decides upon the category item D as the core category item.

A calculation unit 21 is for calculating the relevancy between category items. Specifically, the calculation unit 21 adopts the category item D (referred to as a "core category item D" below), which has been decided by the core category item deciding unit 19, as the core and obtains the degrees of relevancy of other category items to the core category item D (step ST4 in FIG. 2).

In the first embodiment, the calculation unit 21 adopts the items of basic data 1 to 10, which have been found by the search conducted by the search unit 13, as the object of processing and obtains each of the numbers of other category items preceding and succeeding and connected to the core category item D (this includes each of the numbers of other category items further adjacent to these other category items preceding and succeeding and adjacent to the core category item D) as values representing the degrees of relevancy. (The value of degree of relevancy shall be referred to as an "adjacent-category count" below.)

First, the core category item D, which is the category item having the highest frequency of appearance, is adopted as the starting point. Items of basic data for which the category item D (the core category item D) immediately follows the category item of the head sentence are the four items of basic data 7 to 10. Items of basic data for which the category items A, B are arranged preceding the category item D in this order are two, namely the items of basic data 1 and 2, and items of basic data for which the category item C exists ahead of the category item D are two, namely the items of basic data 3 and 4. The adjacent-category count of the category item of the head sentence with respect to the core category item D is 4, the adjacent-category count of the category item B with respect to the core category item D is 2, and the adjacent-category count of the category item A with respect to the category item B adjacent to the core category item D also is 2. The adjacent-category count of the category item C with respect to the core category item D is 2. The adjacent-category count of the category item of the head sentence with respect to the category item C adjacent to the core category item D is 2.

Focusing on category items succeeding the category item D, there are five items of basic data to which category item E is adjacent, namely basic data 1 to 4 and basic data 7 (in case of basic data 1 to 4, category items F, G follow category item E in the order mentioned; in case of basic data 7, category item G follows); items of basic data for which the category items F, G follow in the order mentioned are two, namely basic data 8 and 9; and basic data for which the category item H follows is the basic data 10, namely one item of basic data. That is, the adjacent-category count of the category item E with respect to the core category item D is 5. Furthermore, the adjacent-category count of the category item G with respect to the category item E that is adjacent to the core category item D is 1, and the adjacent-category count of the category item F with respect to the category item E that is adjacent to the core category item D is 4. The adjacent-category count of the category item G with respect to this category item F is 4, and the adjacent-category count of the category item of the tail sentence with respect to this category item G is 4. Furthermore, the adjacent-category count of the category item F with respect to the core category item D is 2, the adjacent-category count of the category item G with respect to this category item F is 2, and the adjacent-category count of the category item of the tail sentence with respect to this category item G is 2. The adjacent-category count of the category item H with respect to the core category item D is 1, and the adjacent-category count of the category item of the tail of the sentence with respect to this category item H is 1.

FIG. 3B is based upon the basic data 1 to 10 (FIG. 3A). With the core category item D as the starting point, FIG. 3B illustrates the order in which the other category items that precede and succeed the core category item D are arranged and shows the above-described adjacent-category counts placed between the category items, as described above.

Next, based upon the adjacent-category counts calculated by the calculation unit 21 for calculating the relevancy between category items, a related category item deciding unit 23 decides a category item having a high relevancy to the core category item from among the category items other than the core category item (step ST5 in FIG. 2).

With reference to FIG. 3B and focusing on category items connected to and preceding the core category item D, the adjacent-category count of the category item of the head sentence with respect to the core category item D is 4, which is the largest; the adjacent-category count of the category item B with respect to the core category item D is 2, and the adjacent-category count of the category item C with respect to the core category item D is 2. Since the adjacent-category count of the category item of the head sentence with respect to the core category item D is largest, the related category item deciding unit 23 decides that the category item connected to and preceding the core category item D is the category item of the head sentence (essentially, the core category item D is situated as the head sentence). Since the category item of the head sentence is a terminus in the forward direction, processing for deciding related category items connected to and preceding the core category item D ends. That is, in the example of FIGS. 3A and 3B, processing for deciding category items (related category items) that precede the core category item D is essentially not executed.

On the other hand, with regard to category items connected to and succeeding the core category item D, the adjacent-category count of the category item E is 5, which is the largest, the adjacent-category count of the category item F is 2 and the adjacent-category count of the category item H is 1. The related category item deciding unit 23 therefore decides that the category item that should be connected to the core category item D next (the adjacent category item immediately following the core category item D) (the related category item) is the category item E. Next, the category items connected to and succeeding the decided category item E are the category items G and F. The adjacent-category count of the category item F with respect to the category item E is 4, with is the largest, and the adjacent-category count of the category item G with respect to the category item E is 1. The related category item deciding unit 23 therefore decides that the category item (related category item) connected to and succeeding the category item E is the category item F. The only category item connected to and succeeding the category item F is the category item G. The related category item deciding unit 23 decides that the category item (related category item) connected to and succeeding the category item F is the category item G. The only category item connected to and succeeding the category item G is the category item of the tail sentence. The related category item deciding unit 23 decides that category item connected to and succeeding the category item G is the category item of the tail sentence. Since the category item of the tail sentence is a terminus in the backward direction, processing for deciding related category items connected to and preceding the core category item D ends.

Thus, in the first embodiment, the related category item deciding unit 23 adopts the core category item D as the starting point and, based upon the adjacent-category counts, decides category items (related category items) that precede and succeed the core category item D. In the examples of FIGS. 3A and 3B, as described above, related category items preceding the core category item D are not decided, and category items E, F and G, which succeed the core category item D, are decided as related category items. That is, the combination of category items DEFG (inclusive of the order thereof) is obtained as the logical framework of the reply to the search criteria. (It goes without saying that the related category item deciding unit 23 can also be referred to as a unit for generating the logical framework of a reply.)

Next, an expression deciding unit 25 decides expressions of the core category item D and related category items (step ST6 in FIG. 2). For example, the expression deciding unit 25 applies the latest segment data with regard to the core category item D and related category items E, F and G. With regard to the items of basic data 1 to 10, the larger the numeral, the newer the data, as mentioned above. That is, the expression deciding unit 25 applies the segment data D10, E7, F9 and G9 with regard to the category items D, E, F and G, respectively.

Next, a unifying unit 27 unifies the category items based upon the expressions of the category items decided by the expression deciding unit 25 (step ST7 in FIG. 2). In the foregoing example, the items of segment data D10, E7, F9 and G9 are unified in the order mentioned. The result of unifying the segment data obtained by the unifying unit 27 is the final reply to the search criteria.

The reply transmitting unit 17 transmits the reply to the terminal device 3 (step ST8 in FIG. 2). Processing by the reply generating server 5 ends.

The reply transmitted to the terminal device 3, namely the text composed of the segment data D10, E7, F9 and G9, is displayed on the display screen of the display unit by the reply display unit 9 of the terminal device 3 as the reply to the search criteria entered by the searcher.

The reply (the combination of category items DEFG) (the text composed of the segment data D10, E7, F9 and G9) created by the reply generating system 1 is a combination that has not been stored as basic data in the storage unit 11. That is, the reply generating system 1 generates a reply that has not been stored in the storage unit 11 and the newly generated reply is presented in response to the wish (search criteria) of the searcher. The newly generated reply is created using, as the core, a category item that has a high relevancy (the category item having the highest frequency of appearance) in relation to the search criteria from among the category items included in a plurality of items of basic data that have been retrieved, and is created so as to incorporate a category item (a related category item) having a high relevancy to this core category item. As a result, there is a high likelihood that a reply conforming to the wish (search criteria) of the searcher can be obtained, and a situation in which a reply that is off the mark is obtained is prevented. Further, the generation of a reply conforming to the latest circumstances can be realized by employing the latest segment data to generate the reply.

Figure 4:
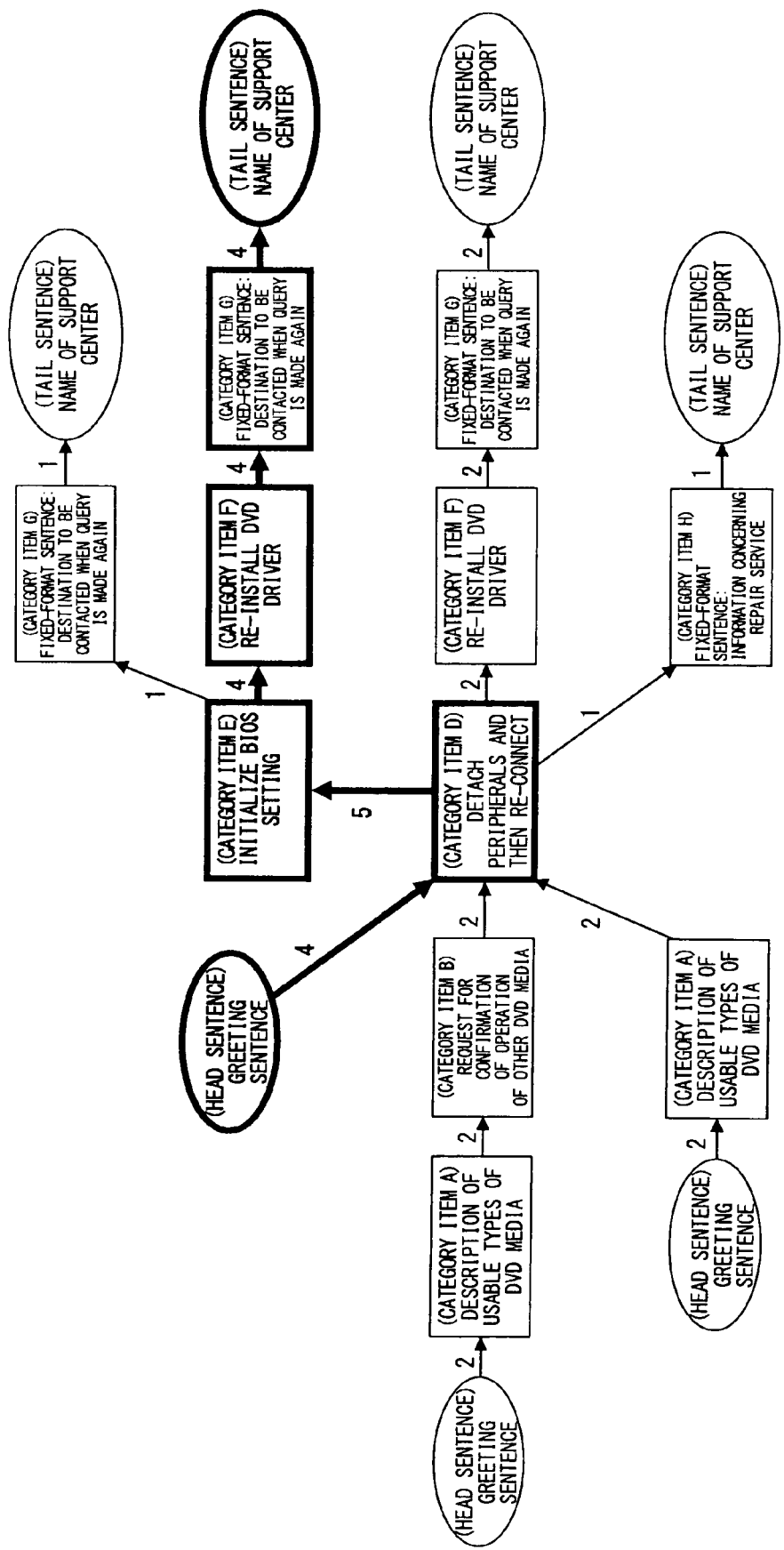
FIG. 4 corresponds to FIG. 3B and specifically illustrates examples of content of category items.

FIG. 4 corresponds to FIG. 3B and illustrates, in easily understandable form, examples of the content (category content) of each of the category items (categories) indicated by the alphabetic characters A to H in FIG. 3B. Here the following will be taken as an example: The search criteria are criteria obtained from the following query by the searcher: "THE PERSONAL COMPUTER DOES NOT RECOGNIZE THE DVD", and the reply to the search criteria is a support-center reply to the query from the searcher (namely a reply generated by the reply generating system 1). The processing for obtaining the search criteria from the above-mentioned query can employ processing whereby a keyword is extracted from a query by analyzing the query and the extracted keyword is adopted as the search criteria, as described in the specification of Japanese Patent Application Laid-Open No. 2005-301856, by way of example.

If a query that is input by the searcher using the terminal device 3 is a concrete question, e.g., one that includes the operating system of the personal computer that will not recognize the DVD, the model of the personal computer and the DVD model (whether it is a DVD-ROM, a DVD-R, etc.), then there is a high likelihood that the reply to this query (search criteria) can use as is a reply (basic data) already stored in the storage unit 11. However, in a case where the query (search criteria) is ambiguous (such as a case where the operating system of the personal computer, the model of the personal computer and the DVD model, etc., are all unspecified), there is a high likelihood that the reply to the query will be a wide-ranging reply or that no reply can be obtained.

Even in the case of the above-mentioned ambiguous query (search criteria), the reply generating system 1 is capable of generating a reply sentence that conforms to the query. In the example illustrated in FIG. 4, an assemblage of text (logical framework of a reply) is generated in response to the query "THE PERSONAL COMPUTER DOES NOT RECOGNIZE THE DVD". The reply is composed of the following in the order mentioned: a "greeting sentence" (sentence head); an advice sentence stating "DETACH PERIPHERALS AND THEN RE-CONNECT"; an advice sentence stating "INITIALIZE BIOS SETTING"; an advice sentence stating "RE-INSTALL DVD DRIVER"; "destination to be contacted when a query is made again"; and "name of support center" (tail sentence).

By utilizing the reply candidates (or past examples of replies) (which correspond to the basic data 1 to 10 shown in FIG. 3A) with regard to the above-mentioned query, the logical framework of the reply sentences (the combination of category items) shown in FIG. 4 is created so as to include the core category item D (the advice sentence stating "DETACH PERIPHERALS AND THEN RE-CONNECT") having a high likelihood of being required as the reply to the query, and so as to incorporate the related category items (category items E, F and G) having a high relevancy to the core category item D. As a result, even if the query (search criteria) is ambiguous, there is a high likelihood that the logical framework of the reply sentence shown in FIG. 4 will be satisfactory as the reply to the query. Further, since a category item having little relevancy (e.g., the category item A) is not included in the reply sentence, a concise reply sentence is obtained.

Naturally, in a case where the reply obtained does not satisfy the searcher, the searcher would change the content of the query (the search criteria) and execute search processing again. The reply generating system 1 would again search the basic data (reply candidates and past examples of replies) in accordance with the new query content and create a new reply sentence (combination of category items) using the basic data searched and retrieved.

The reply generating system 1 not only makes it possible to create an appropriate and concise reply sentence with respect to ambiguous search criteria (query sentence) in the manner described above but can also be utilized as follows: For example, if basic data (a reply sentence) relating to a new product has not been stored in the storage unit 11, then a reply sentence relating to the new product is created anew by using basic data relating to an existing similar product that has been stored in the storage unit 11.

Second Embodiment

In the first embodiment set forth above, a category item having the highest frequency of appearance among a plurality of category items included in a plurality of items of basic data found by a search conducted by the search unit 13 is positioned as a core category item, and a plurality of category items (related category items) preceding and succeeding the core category item are decided based upon adjacent-category counts of category items preceding and succeeding the core category item. A reply composed of the core category item and plurality of related category items (the combination of category items DEFG in the above-described example) (eventually the data obtained by concatenating the segment data D10, E7, F9 and G9) is presented to the searcher. By contrast, a second embodiment generates a plurality of combinations composed of a plurality of category items that include a core category item and assigns a priority to each of the generated plurality of combinations of category items. In the second embodiment, a plurality of replies are generated, as will be described next. It should be noted that the reply generating system of the second embodiment has the same configuration as that of the reply generating system 1 (FIG. 1) of the first embodiment.

Figure 5:
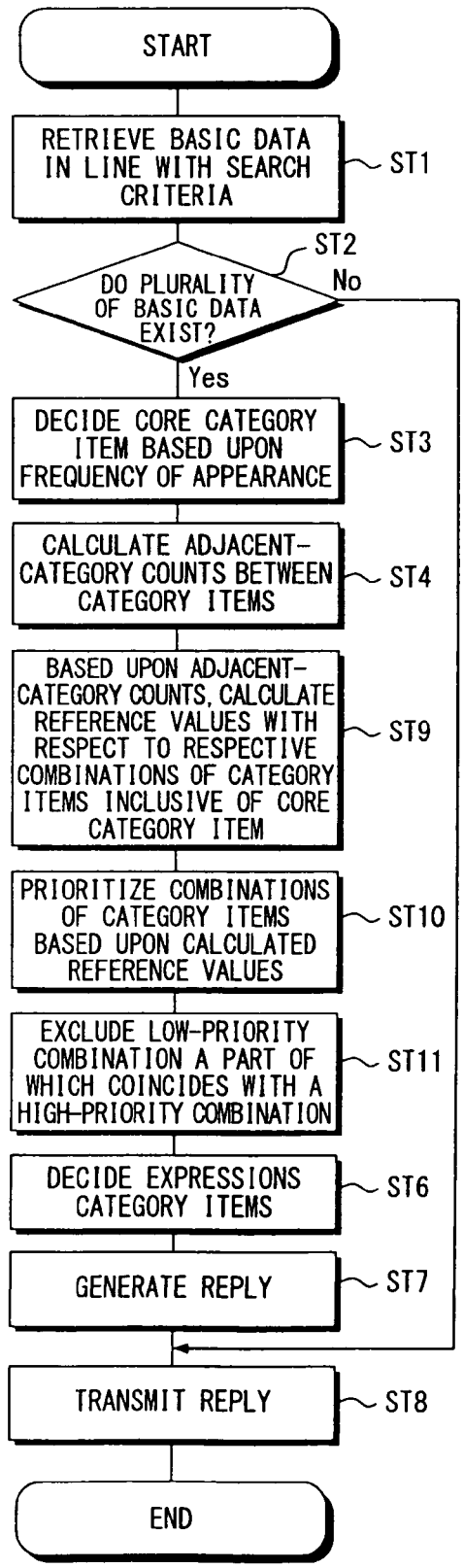
FIG. 5 is a flowchart illustrating an example of processing by a reply generating server according to a second embodiment.

FIG. 5 is a flowchart illustrating an example of processing executed by the reply generating server 5 of the second embodiment. Processing steps identical with those of the flowchart (FIG. 2) of processing by the reply generating server 5 in the first embodiment are designated by like step numbers and need not be described again. Processing by the reply generating system 1 of the second embodiment will be described utilizing the flowchart of FIG. 5 and FIGS. 3A and 3B described in the first embodiment.

In a case where basic data found by a search conducted by the search unit 13 is the basic data 1 to 10 in FIG. 3A, the core category item deciding unit 19 decides upon the category item D, which has the highest frequency of appearance, as the core category item. This is the same as in the first embodiment (steps ST1 to ST3 in FIG. 5).

All combinations of category items from sentence head to sentence tail, inclusive of the core category item D, are ascertained by the calculation unit 21 for calculating the relevancy between category items. In the example shown in FIGS. 3A and 3B, 12 combinations, namely DEG, DEFG, DFG, DH, ABDEG, ABDEFG, ABDFG, ABDH, CDEG, CDEFG, CDFG and CDH, are the combinations of category items (the category items of the sentence head and sentence tail are omitted). These 12 combinations of category items are ascertained.

In the second embodiment, by using the above-mentioned adjacent-category count, the calculation unit 21 for calculating the relevancy between category items computes reference values, which are for determining priority, with respect to respective ones of all combinations of category items from the head sentence to the tail sentence, inclusive of the core category item D (steps ST4, ST9 and ST10).

The computation of reference values with respect to respective ones of the combinations of category items using the adjacent-category count is performed as follows:

In the case of the combination of category items DEG in FIG. 3A, the adjacent-category count of the category item of the head sentence with respect to the category item D is 4, the adjacent-category count of the category item E with respect to the category item D is 5, the adjacent-category count of the category item G with respect to the category item E is 1, and the adjacent-category count of the category item of the sentence tail with respect to the category item G is 1. The reference value with respect to the combination of category items DEG is decided upon as the total of these adjacent-category counts, namely 11 (=4+5+1+1).

The calculation unit 21 for calculating the relevancy between category items calculates reference values in similar fashion with regard to the other 11 combinations of category items as well. That is, the reference value of the combination of category items DEFG is 21, the reference value of the combination of category items DFG is 10, the reference value of the combination of category items DH is 6, the reference value of the combination of category items ABDEG is 13, the reference value of the combination of category items ABDEFG is 23, the reference value of the combination of category items ABDFG is 12, the reference value of the combination of category items ABDH is 8, the reference value of the combination of category items CDEG is 11, the reference value of the combination of category items CDEFG is 21, the reference value of the combination of category items CDFG is 10, and the reference value of the combination of category items CDH is 6.

Next, the related category item deciding unit 23 prioritizes all of the above-mentioned combinations of category items in order of decreasing reference value (step ST10 in FIG. 5). In the example shown in FIGS. 3A and 3B, the combination with the highest priority is the combination of category items ABDEFG, which has 23 as its reference value. The combinations having the next highest reference value are the combination of category items DEFG and the combination of category items CDEFG, each of which has 21 as its reference value.

In this embodiment, if a plurality of combinations having the same reference value exist, the priority of the combination having the smallest number of category items is raised. Accordingly, the priority of the combination of category items CDEFG falls below that of the combination of category items DEFG. FIG. 6 illustrates the 12 combinations of category items mentioned above together with their reference values in the order of priority.

The combination of category items CDEFG (ranked third) is the result of adding the category item C to the beginning of the combination of category items DEFG (ranked second). That is, part of the combination of category items CDEFG ranked third coincides with the combination of category items DEFG ranked second. If part of a low-priority combination of category items coincides with a high-priority combination of category items, the related category item deciding unit 23 excludes this low-priority combination of category items (step ST11 in FIG. 5). Carrying out such an exclusion prevents a situation in which is the searcher is presented with a reply based upon a combination of category items that is merely the result of adding another category item to a combination of category items having a higher priority. That is, a reply based upon a combination of category items having a different logical framework is presented and a situation in which a combination of category items having a substantially similar logical framework is presented to the searcher redundantly can be prevented.

In the example of the 12 combinations of category items shown in FIG. 6, the combination of category items CDEFG ranked third, combination of category items CDEG ranked seventh, the combination of category items CDFG ranked ninth and the combination of category items CDH ranked $12^{th}$ are excluded.

In a manner similar to that of the first embodiment, the expression deciding unit 25 decides the expression of each category item by applying the newest segment data to each of the combinations of category items with the exception of the excluded combinations of category items (step ST6). The unifying unit 27 then unifies the segment data on a per-combination basis to thereby generate replies (step ST7). The plurality of unified items of segment data are transmitted to the terminal device 3 as the reply (ST8). The plurality of replies are displayed on the reply display unit 9 of the terminal device 3 in the order of their priorities.

In the second embodiment also, in a manner similar to that of the first embodiment, a reply is created so as to include the category item having the highest frequency of appearance (the core category item) from among the category items included in the basic data 1 to 10 searched and retrieved. A reply conforming to the wish (search criteria) of the searcher can be obtained. Furthermore, in the second embodiment, a plurality of replies conforming to the wish (search criteria) of the searcher are presented to the searcher with priority in accordance with the reference values calculated based upon the adjacent-category counts. The searcher can thus view a plurality of replies. Further, since a plurality of replies can be presented to the searcher in accordance with priority (e.g., in the order of priorities), it is possible to implement an easy-to-use presentation of replies.

Naturally, in the second embodiment set forth above, a reply may just as well be generated with regard solely to the combination of category items that has the highest priority.

Third Embodiment

In the first and second embodiments, the category item having the highest frequency of appearance among a plurality of category items included in a plurality of items of basic data found by the search conducted by the search unit 13 is positioned as the core category item. In a third embodiment, unlike the first and second embodiments, the core category item is decided based upon the number of category items connected to and preceding and succeeding each category item (the number shall be referred to as the "preceding-succeeding-adjacent-category count" below). Further, as will be described later, the processing for deciding related category items is executed based upon the preceding-succeeding-adjacent-category count of each category item connected to and preceding and succeeding the core category item. It should be noted that the reply generating system of the third embodiment has the same configuration as that of the reply generating system 1 (FIG. 1) of the first embodiment.

Figure 7:
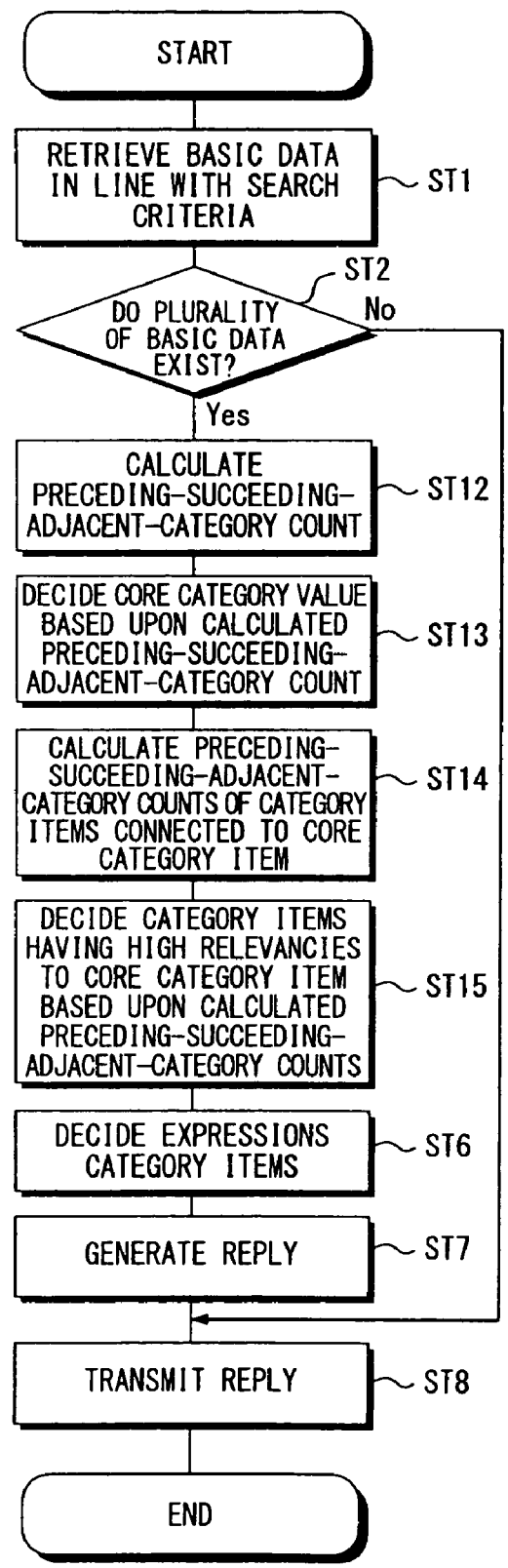
FIG. 7 is a flowchart illustrating an example of processing by a reply generating server according to a third embodiment.
Figures 8A, 8B:
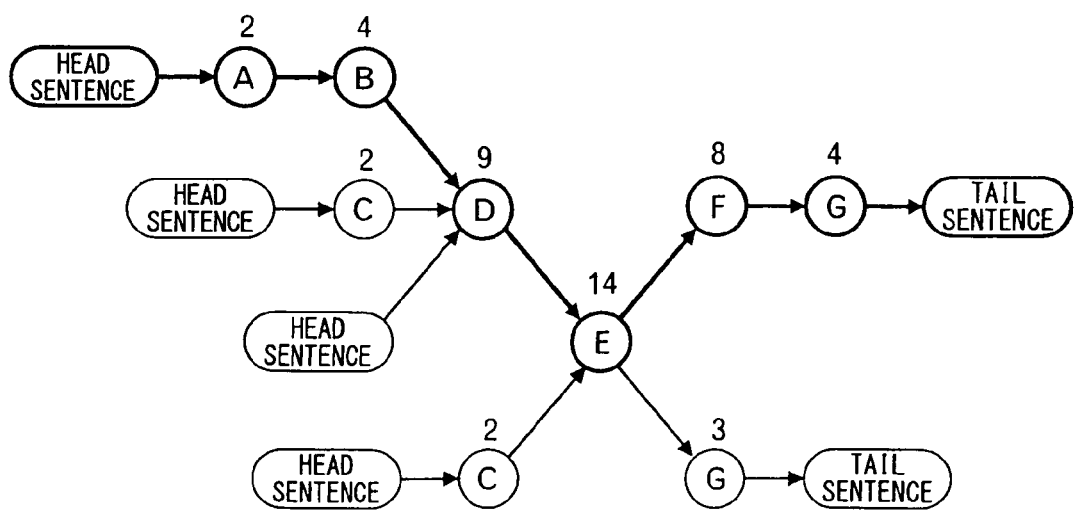
FIG. 8A illustrates an example of basic data found by a search conducted by a search unit.
FIG. 8B illustrates a core category item E, the order of arrangement of other category items preceding and succeeding the core category item E, and preceding succeeding-adjacent-category counts appended to category items.

FIG. 7 is a flowchart illustrating an example of processing executed by the reply generating server 5 of the third embodiment. Processing steps identical with those of the flowchart (FIG. 2) of processing by the reply generating server 5 in the first embodiment are designated by like step numbers and need not be described again. FIG. 8A illustrates the basic data 1 to 10 (the same as in FIG. 3A) found by the search conducted by the search unit 13. FIG. 8B is for facilitating understanding of the course of reply generation processing by the reply generating unit 15 in the third embodiment. FIG. 8B illustrates a core category item E as the starting point, the order of arrangement of other category items preceding and succeeding the core category item E and the preceding-succeeding-adjacent-category counts (described later) appended to the category items.

The processing by the reply generating system 1 in the third embodiment will be described in detail with reference to the flowchart of FIG. 7 and FIGS. 8A, 8B taking the basic data 1 to 10 as an example.

The calculation unit 21, which is for calculating the relevancy between category items, calculates the number of category items adjacent to and preceding and succeeding (namely the preceding-succeeding-adjacent-category count of) each of the category items A to F (step ST12).

By way of example, focus on category item A (segment data A1 and segment data A2). The category item A is included in the basic data 1 and 2. In each of these, the category item of the head sentence is adjacent to and precedes the category item A, and the category item B (segment data B1 and segment data B2) is adjacent to and succeeds the category item A. In the third embodiment, unlike the first embodiment, the adjacent-category counts of the category items of the head sentence and tail sentence are not taken into consideration. Therefore, the preceding-succeeding-adjacent-category count regarding the category item A is 2.

Now focus on category item B (segment data B1 and segment data B2). The category item B is included in the basic data 1 and 2. The category item A (segment data A1 and segment data A2) is adjacent to and precedes the category item B, and the category item D (segment data D1 and segment data D2) is adjacent to and succeeds the category item B. Therefore, the preceding-succeeding-adjacent-category count regarding the category item B is 4.

Focusing now on category item C, the category item C (segment data C3, C4, C5, C6) is included in the basic data 3 to 6. In all of the items of basic data 3 to 6, category items are adjacent to the category item C but only succeed it. Therefore, the preceding-succeeding-adjacent-category count regarding the category item C is 4.

Focusing now on category item D, the category item D (segment data D1, D2, D3, D4, D7, D8, D9 and D10) is included in the basic data 1 to 4 and in the basic data 7 to 10. In the case of the basic data 1 to 4, other category items are adjacent to and precede and succeed the category item D. In the case of the basic data 7 to 10, other category items are adjacent to the category item D but only succeed it. Therefore, the preceding-succeeding-adjacent-category count regarding the category item D is 12.

Focusing now on category item E, the category item E (segment data E1, E2, E3, E4, E5, E6 and E7) is included in the basic data 1 to 7. In all of the items of basic data 1 to 7, other category items are adjacent to and precede and succeed the category item E. Therefore, the preceding-succeeding-adjacent-category count regarding the category item E is 14.

Focusing now on category item F, the category item F (segment data F1, F2, F3, F4, E8 and F9) is included in the basic data 1 to 4, 8 and 9. In all of the items of basic data 1 to 4, 8 and 9, other category items are adjacent to and precede and succeed the category item F. Therefore, the preceding-succeeding-adjacent-category count regarding the category item F is 12.

The category items G and H are fixed-format category items representing fixed-format text, etc., and hence the preceding-succeeding-adjacent-category counts are not calculated.

The core category item deciding unit 19 adopts the category item E, which has the highest preceding-succeeding-adjacent-category count, as the core category item (step ST13).

Next, the calculation unit 21, which is for calculating the relevancy between category items, applies processing to the items of basic data 1 to 7 that include the core category item E and, with the core category item E as the starting point, calculates the preceding-succeeding-adjacent-category counts of other category items connected to the core category item E (step ST14).

Two category items C (segment data C5 and C6) and five category items D (segment data D1, D2, D3, D4 and D7 are adjacent to and precede the core category item E (segment data E1 to E7). The preceding-succeeding-adjacent-category count of the two category items C adjacent to the core category item E is 2, and the preceding-succeeding-adjacent-category count of the five category items D adjacent to the core category item E is 9.

Furthermore, two category items B (segment data B1 and B2) and two category items C (segment data C3 and C4) are adjacent to and precede the category item D that is adjacent to the core category item E [as mentioned above, the adjacency of the category items of the head sentence (and tail sentence) are not taken into consideration in the third embodiment]. The preceding-succeeding-adjacent-category count of the two category items B further adjacent to the category item D that is adjacent to the core category item E is 4, and the preceding-succeeding-adjacent-category count of the category item C further adjacent to the category item D that is adjacent to the core category item E is 2.

Furthermore, two category items A (segment data A1 and A2) are adjacent to and precede the category item B further adjacent to the category item D that is adjacent to the core category item E. The preceding-succeeding-adjacent-category count of the category item A is 2.

Four category items F (segment data F1 to F4) and three category items G (segment data G5 to G7) are adjacent to and succeed the core category item E. The preceding-succeeding-adjacent-category count of the four category items F adjacent to the core category item E is 8, and the preceding-succeeding-adjacent-category count of the three category items G adjacent to the core category item E is 3.

Four category items G (segment data G1 to G4) are adjacent to and succeed the category item F adjacent to the core category item E. The preceding-succeeding-adjacent-category count of the three category items G adjacent to the category item F that is adjacent to the core category item E is 4.

In FIG. 8B, the preceding-succeeding-adjacent-category counts of respective ones of the category items connected to and preceding and succeeding the core category item E calculated at set forth above are shown near the category items.

On the basis of the preceding-succeeding-adjacent-category counts mentioned above, the related category item deciding unit 23 adopts category items having high relevancies from among category items other than the core category item as related category items (step ST15 in FIG. 7). More specifically, the related category item deciding unit 23 decides upon category items having large preceding-succeeding-adjacent-category counts as related category items successively in respective ones of the category items arrayed preceding and succeeding the core category item E.

In the direction from the core category item E back to the head sentence (the forward direction) in FIG. 8B, the category items D, B and A are decided upon successively as related category items. In the direction from the core category item E toward the end sentence (the backward direction), the category items F and G are decided upon successively as related category items.

The processing by the expression deciding unit 25 and the processing by the unifying unit 27 is similar to that of the first embodiment. That is, the expression deciding unit 25 decides the expressions of the core category item E and related category items A, B, D, F and G (step ST6). Since the expression deciding unit 25 applies the newest segment data, the segment data E7 is applied with regard to the core category item E and the segment data A2, B2, D10, E7, F9 and G9 is applied with regard to related category items A, B, D, F and G, respectively. The unifying unit 27 unifies the segment data A2, B2, D10, E7, F9 and G9 in the order mentioned and adopts the result as the reply (step ST7). The reply is transmitted to the terminal device 3 (step ST8).

In the third embodiment also, the reply (the combination of category items ABDEFG) (the text composed of the segment data A2, B2, D10, E7, F9 and G9) created by the reply generating system 1 is a combination that has not been stored as basic data in the storage unit 11. In the third embodiment, the category item having the largest preceding-succeeding-adjacent-category count (namely the core category item) is adopted as the core and category items having high relevancies to the core category item (namely the related category items) are decided successively based upon the preceding-succeeding-adjacent-category counts. A category item having a large preceding-succeeding-adjacent-category count is considered to be a category item having a high likelihood of being necessary in a reply to search criteria. In the third embodiment, therefore, a reply conforming to the wish (search criteria) of the searcher can be obtained and a situation in which a reply that is off the mark is obtained is prevented.

It may be so arranged that in a case where search criteria have been set anew, the reply generating server 5 of FIG. 1 determines whether search criteria related to the newly set search criteria exists in search criteria set in the past and, if such related search criteria does exist, then, when the search unit 13 and reply generating unit 15 execute processing relating to the newly set search criteria, reference may be made as necessary to, e.g., the related search criteria, information relating to a user of the reply generating server who set the related search criteria and information relating to processing for generating replies and the logical framework. As a result of the reply generating server 5 obtaining a reply by making such reference, it is possible for the user of the terminal device 3 to obtain information that is more likely to be what the searcher truly wants to know.

Further, the calculation unit 21 for calculating the relevancy between category items may be adapted so as to find not only the relevancy (adjacent-category count or preceding-succeeding-adjacent-category count) between category items concerning basic data that includes a core category item but also the relevancy between category items by referring also to basic data that does not include a core category item. Furthermore, the calculation unit may be adapted so as to find not only the relevancy between adjacent category items but also the relevancy between category items that are not adjacent.

Furthermore, it may be so arranged that in order that basic data that includes each of the category items will be retrieved again from the storage unit 11 in a case where the expression deciding unit 25 decides the expression of each category item, the reply generating unit 15 sets the search criteria again and refers to the basic data, which has been searched and retrieved based upon these re-set search criteria, at the time of the processing for deciding a core category item executed by the deciding unit 19, the processing executed by the calculation unit 21 for calculating the relevancy between category items, the processing for deciding related category items executed by the deciding unit 23, the processing for deciding expressions executed by the deciding unit 25 and the unification processing by the unifying unit 27. Furthermore, it may be so arranged that even in a case where only a single item of basic data pertaining to search criteria exists, the reply generating unit 15 generates a reply in such a manner that the expression deciding unit 25 will execute processing for selecting the latest expression with regard to the category item included in this basic data.

Furthermore, in regard to the deciding of an expression for each category item, the expression deciding unit 25 may revise a unified expression or perform a check of the grammar, by way of example.

Furthermore, the reply transmitting unit 17 may transmit a reply to the reply display unit 9 of the terminal device 3 in response to a command from the user of the terminal device 3.

What is claimed is:

1. A reply generating apparatus, comprising:
a storage unit of a computer in which a plurality of text aggregates of previous replies to queries have been stored, wherein a text aggregate of said text aggregates represents a text that is divided into text segments, each of which has a coherent meaning and each of which comprises a text having a time-wise relevancy logical flow, each of the text segments being classified under at least one of a plurality of category items;
a search unit for searching said storage unit in accordance with an applied query;
a deciding unit for deciding a core category item that has a highest frequency of appearance among the category items, wherein the core category item is decided from the plurality of category items that correspond to the text segments that constitute each of the text aggregates that are found by the search unit in accordance with the applied query;
a counter to calculate an adjacent-category count numbers for each category item of the plurality of category items, a number of other category items adjacent to each category item including the core category item, based on the text aggregates that are found by the search unit in accordance with the applied query, wherein the adjacent-category count is calculated with regard to each of the category items that correspond to the text segments that constitute said each of the text aggregates that are found by the search unit in accordance with the applied query;
a related category item deciding unit for deciding related category items to be adjacent to the core category item from the plurality of category items other than the core category item, based upon the adjacent-category count numbers calculated by said counter; and
a logical framework of a reply generating unit for generating a new logical framework of a reply to the applied query, wherein the new logical framework of the reply adopts the core category item as a core and places the related category items adjacent to the core category item to express a reply along lines of the new logical framework of a reply to an end user,
wherein the category items include a fixed-format category item under which a text segment having a stereotypical meaning is classified, and
wherein said deciding unit decides the core category item from category items other than the fixed-format category item.

2. The apparatus according to claim 1, wherein on a basis of the adjacent-category count numbers, said related category item deciding unit decides a related category item, which is further adjacent to the core category item, from the category items other than the category item decided upon as the core category item and the category item decided upon as the related category item adjacent to the core category item.

3. The apparatus according to claim 2, further comprising an expression deciding unit for deciding upon at least one of the text segments, which have been stored in the storage unit and classified under the core category item, as a text segment that expresses the core category item, and deciding upon at least one of text segments, which have been stored in the storage unit and classified under the related category items, as a text segment that expresses the related category items.

4. The apparatus according to claim 1, further comprising an expression deciding unit for deciding upon at least one of the text segments, which have been stored in the storage unit and classified under the core category item, as a text segment that expresses the core category item, and deciding upon at least one of the text segments, which have been stored in the storage unit and classified under the related category items, as a text segment that expresses the related category items.

5. The apparatus according to claim 1,
wherein said reply generating unit prioritizes each of a plurality of combinations of the core category item and the related category items based upon the adjacent-category count numbers regarding the core category item and the related category items that exist in a combination, and, in a case where a related category item of a part of a low-priority combination matches a related category item of a part of a high-priority combination, excludes the low-priority combination from the reply generated in the reply generating unit.

6. The apparatus according to claim 1, wherein the category items corresponding to a respective plurality of the text segments are arranged in an order.

7. The apparatus according to claim 1, wherein in accordance with the applied query, the text aggregate is retrieved from the plurality of text aggregates that is stored in the storage unit.

8. The apparatus according to claim 1, wherein the related category item deciding unit decides a category item that has a highest degree of association with the query among the category items as the core category item.

9. The apparatus according to claim 1, wherein the related category item deciding unit decides from the category items that correspond to the text segments that constitute said each of the text aggregates that are found, a category item of a largest number as the core category item.

10. The apparatus according to claim 1, wherein the related category item deciding unit decides from the plurality of category items a category item having a largest number of adjacent other category items as the core category item.

11. A method of generating a reply, said method comprising:
storing a plurality of text aggregates of previous replies to queries in a storage unit, wherein a text aggregate of said text aggregates represents a text that is divided into text segments, each of which has a coherent meaning and each of which comprises a text having a time-wise relevancy logical flow, each of the text segments being classified under at least one of a plurality of category items;
searching the storage unit in accordance with an applied query;
deciding a core category item that has a highest frequency of appearance among the category items, wherein the core category item is decided from the plurality of category items that correspond to the text segments that constitute each of the text aggregates that are found by a search unit in accordance with the applied query;
calculating an adjacent-category count numbers for each category item of the plurality of category items, a number of other category items adjacent to each category item including the core category item, based on the text aggregates that are found by the search unit in accordance with the applied query, wherein the adjacent-category count is calculated with regard to each of the category items that correspond to the text segments that constitute said each of the text aggregates that are found by the search unit in accordance with the applied query;
deciding related category items to be adjacent to the core category item from the plurality of category items other than the core category item, based upon the adjacent-category count numbers calculated; and generating a new logical framework of a reply to the applied query, wherein the new logical framework of the reply adopts the core category item as a core and places the related category items adjacent to the core category item to express a reply along lines of the new logical framework of a reply to an end user, wherein the category items include a fixed-format category item under which a text segment having a stereotypical meaning is classified, and wherein in said deciding the core category item is decided from category items other than the fixed-format category item.

12. A non-transitory computer-readable storage medium encoded with a computer program, the computer program including instructions for a method of generating a reply, said method comprising:

storing, in a computer having a storage unit a plurality of text aggregates of previous replies to queries, wherein a text aggregate of said text aggregates represents a text that is divided into text segments, each of which has a coherent meaning and each of which comprises a text having a time-wise relevancy logical flow and each of the text segments is classified under at least one of a plurality of category items;

searching the storage unit in accordance with an applied query;

deciding a core category item that has a highest frequency of appearance among the category items, wherein the core category item is decided from the plurality of category items that correspond to the text segments that constitute each of the text aggregates that are found by a search unit in accordance with the applied query;

calculating an adjacent-category count numbers for each category item of the plurality of category items, a number of other category items adjacent to each category item including the core category item, based on the text aggregates that are found by the search unit in accordance with the applied query, wherein the adjacent-category count is calculated with regard to each of the category items that correspond to the text segments that constitute said each of the text aggregates that are found by the search unit in accordance with the applied query;

deciding related category items to be adjacent to the core category item from the plurality of category items other than the core category item, based upon the adjacent-category count numbers calculated; and generating a new logical framework of a reply to the applied query, wherein the new logical framework of the reply adopts the core category item as a core and places the related category items adjacent to the core category item to express a reply along lines of the new logical framework of a reply to an end user, wherein the category items include a fixed-format category item under which a text segment having a stereotypical meaning is classified, and wherein in said deciding the core category item is decided from category items other than the fixed-format category item.

* * * * *